United States Patent [19]

Jernakoff

[11] 4,376,912
[45] Mar. 15, 1983

[54] ELECTRODELESS LAMP OPERATING CIRCUIT AND METHOD

[75] Inventor: George Jernakoff, Loudonville, N.Y.

[73] Assignee: General Electric Company, Schenectady, N.Y.

[21] Appl. No.: 170,922

[22] Filed: Jul. 21, 1980

[51] Int. Cl.³ .................... H05B 41/16; H05B 41/24
[52] U.S. Cl. ............................ 315/248; 315/DIG. 5;
        315/205; 315/344; 315/276; 315/278
[58] Field of Search ................. 315/DIG. 5, DIG. 7,
        315/289, 205, 209, 277, 248, 344, 276, 278

[56] References Cited

U.S. PATENT DOCUMENTS

| | | | |
|---|---|---|---|
| 3,471,747 | 10/1969 | Gershen | 315/289 X |
| 4,127,798 | 11/1978 | Anderson | 315/DIG. 5 |
| 4,233,541 | 11/1980 | Ferro | 315/248 |
| 4,245,177 | 1/1981 | Schmitz | 315/DIG. 5 |
| 4,245,178 | 1/1981 | Justice | 315/344 |
| 4,298,828 | 11/1981 | Justice et al. | 315/344 |
| 4,320,325 | 3/1982 | Anderson | 315/205 |

FOREIGN PATENT DOCUMENTS

| | | | |
|---|---|---|---|
| 1125902 | 9/1968 | United Kingdom | 331/112 |
| 1302902 | 1/1973 | United Kingdom | 331/112 |
| 1308578 | 2/1973 | United Kingdom | 315/209 |
| 1366512 | 9/1974 | United Kingdom | 331/112 |

Primary Examiner—Saxfield Chatmon, Jr.
Attorney, Agent, or Firm—Marvin Snyder; James C. Davis, Jr.

[57] ABSTRACT

An operating circuit and method for efficiently operating and starting an electrodeless lamp having a magnetic core operated at radio frequencies. The circuit generates a current which flows through the winding of an electric field inducing means in the lamp in a reverse-bias direction, with respect to a drive current, to operate the core of the inducing means in all quadrants of the B-H curve, with the time average of all current through the lamp winding equaling approximately zero in order to avoid or minimize heat energy losses and sharp current peaks caused by saturation. This also allows use of lower current-capacity less-expensive components. The circuit repetitively applies constant-current DC drive pulses to the lamp winding for a small percentage of an interval during which energy is stored, which is used to generate the reverse-bias current. Additionally, energy of flyback associated with turning-off of current in the lamp-winding-and-core is maximally limited to the winding itself for facilitating faster starts.

17 Claims, 6 Drawing Figures

ELECTRODELESS LAMP OPERATING CIRCUIT AND METHOD

INCORPORATION BY REFERENCE

The principles of operation of induction ionized gas lamps using ferrite core transformers, commonly called electrodeless lamps, are disclosed in U.S. Pat. Nos. 3,500,118, issued Mar. 10, 1970; 3,521,120, issued July 21, 1970; and 3,987,335, issued Oct. 19, 1976, to John Anderson; and 4,005,330, issued Jan. 25, 1977, to Homer H. Glascock, Jr. and John M. Anderson, all of which are assigned to the assignee of the present invention.

The disclosures of the above-referenced patents are incorporated by reference herein.

BACKGROUND OF THE INVENTION

This invention relates to circuits for and methods of efficiently operating lamps which utilize electromagnetic field inducing means to ionize a gas within a sealed envelope in order thereby to activate fluorescent material and produce light. Much research has been performed in the field of electrodeless light sources inasmuch as they require less electrical power to operate than conventional incandescent lamps and are generally several times more efficient than incandescent lamps on a lumens per watt basis. Electrodeless lamps usually comprise an input winding surrounding a toroid or annular core, (the combined coil and core serving as the inducing means when current flows such that an electromagnetic field is produced), and an ionizable gaseous radiation medium within a non-oxidizing atmosphere contained within a lamp envelope. The gas is ionized by the inducing means which results in radiation from the ionized gas exciting lamp phosphors provided on the inner surface of the envelope or alternatively on the outer surface of the core, which in turn causes emission of visible light. The ionized gas is usually not relied upon to produce substantial visible light emission, but rather to produce radiation which causes visible light to be emitted from the thereby excited fluorescent phosphor. As is well known, this approach is significantly more energy efficient than incandescent lighting. Electrodeless lamps usually utilize a core of iron or ferromagnetic material. Examples of such cores are disclosed in U.S. Pat. No. 1,534,251. However, as brought out in U.S. Pat. No. 4,005,330, air core and iron core transformers are subject to relatively large heat losses. Thus, they are not practical for operation at radio frequencies ordinarily required for efficient operation of gaseous discharge lamps; and ferrite or similar core materials are better suited to provide the high permeability and low internal heat loss desired at radio frequency operation of such lamps. The term "radio frequencies" as used herein is intended to mean all frequencies above the humanly audible range up to approximately 10 MHz unless otherwise stated. As is well known, a ferrite is a ceramic-like material possessing ferromagnetic properties. Ferrites, as with all ferromagnetic core materials, are subject to undesirable energy losses in the form of heat when magnetic saturation is approached in operation. Additionally, in the above-noted U.S. Pat. No. 4,005,330, 50 kHz is disclosed as an appropriate operation frequency for electric field inducing means including ferrite cores.

The typical B-H magnetization curve for a magnetic core of the type used in electric field inducing means of electrodeless lamps is well known in the art. In the operation of prior electrodeless lamps including electric field inducing means comprising ferrite cores and windings, the cores were permitted to operate in the saturation region of the first quadrant of the typical B-H magnetization curve. This mode of operation results in substantial heat losses and thus inefficient energy utilization. Additionally, when the core becomes saturated, the inductance becomes substantially zero and the current accordingly rises rapidly. For example, a peak current of 3 amperes might occur at saturation, while the peak current might be one ampere when the core is not at saturation. Thus, by avoiding saturation, rapid current rises can be minimized or avoided, desirably enabling the use of less costly lower current rated components.

One prior approach for avoiding core saturation as disclosed in U.S. Pat. No. 4,002,999 involves using a detector to detect on-coming saturation and produce a reverse-bias input current through the core to prevent full core saturation. However, this approach requires use of a relatively complex detection circuit.

In normal operation of electrodeless lamps, a reverse EMF or flyback voltage is induced in the winding of the electric field inducing means as a result of the normal periodic "on/off" operation of a controlling means. This results in a momentary voltage across the winding which is opposite in polarity to, and of a magnitude several times larger than, that which appears across the winding just before the switch is opened. This voltage has been utilized to produce high voltage firing of the lamps and to keep them lit, but generally a substantial portion of energy is wastefully dissipated in the circuit externally of the lamp winding.

OBJECTS OF THE INVENTION

It is an object of this invention to provide a new and improved electrodeless lamp operating circuit wherein a reverse-bias current to the core of the lamp winding is employed to prevent magnetic saturation of the core and thereby minimize associated energy losses.

Another object is to provide a new and improved electrodeless lamp operating circuit having a reverse-bias current generating circuit which is self-compensating in response to variations in an associated DC supply voltage.

Another object is to new and improved means and methods for reducing the current capacity requirements in an electrodeless lamp operating circuit to thereby reduce the cost and enhance the life of components used in the circuit.

Another object is to provide a new and improved circuit for serving both as an operating circuit and a starting circuit for an electrodeless lamp.

Another object is to provide an electrodeless lamp control circuit including means for providing a low voltage feedback effective for supplying both a substantially constant reverse-bias current to the winding of an electric field inducing means in the lamp and a low voltage source of energy to means for controlling current through the winding.

Another object is to new and improved means and method of maximizing the energy of flyback that is applied to the lamp and which is generated by the shut-off of drive current to the lamp, to thereby facilitate fast starting of the lamp.

SUMMARY OF THE INVENTION

The present invention involves the concept of storing energy from a voltage derived from the DC energizing current for an electrodeless lamp and generating from that energy a current through the lamp winding in the reverse-bias direction such that the core does not go into magnetic saturation, with the result that current through the winding remains relatively constant. The lamp winding is pulse-driven by a DC source in cooperation with a solid-state switch wherein the length of the pulse and the interval between pulses is controlled by a pulse width modulator, constituting a form of timing means. A very high efficiency voltage transformer, having the primary thereof in parallel with the lamp winding, provides at its secondary the voltage derived from the DC energizing current of the lamp. The transformer, typically of the coils-and-core type, is nonsaturable under the operating conditions of the present invention. The transformer is connected such that the polarity of the secondary is opposite to that of the primary. This secondary voltage provides the energy for producing the reverse-bias current to the lamp winding.

In the preferred embodiment, the energy is cyclically stored in a charge storage device from which the reverse-bias current is generated. Such current is substantially constant when the time period in which the DC energizing current through the lamp is small compared to the time of an interval, or compared to the time in which only the reverse-bias current is flowing through the lamp winding. A DC blocking means prevents any substantial reverse-bias current from flowing through the primary. By feeding a reverse-bias current through the lamp winding at times when the lamp is not driven, the core is operated in all quadrants of the B-H curve and both saturation and a rapid current rise, or sharp current peak, are avoided. Avoidance of a sharp current peak permits use of components with lower peak amperage ratings and thereby enables lower component cost and realization of enhanced component life in addition to decreased energy losses. When a DC drive current pulse provided by the timing means is "on", a portion of that energy is utilized to generate a reverse-bias current through the lamp at a time when the lamp is not being driven. The "on" time of the pulse is only a minor percentage of the time of an interval, and, accordingly, a charge storage device is employed to store charge during the time that the pulse is "on" and then to generate the reverse-bias current.

The energy of flyback generated in the lamp winding at the time of shut-off of applied voltage and applied current is substantially limited to the lamp winding by use of a diode and an RF choke, a form of isolation means, which prevent current generation associated with flyback energy from occurring in the circuit elsewhere than in the lamp winding. The RF choke prevents the very high transient voltages from reaching the portions of the circuit that produce the reverse-bias current. The choke also serves to prevent a short circuit between the DC reference voltage bus through the capacitor to the collector of the solid-state switch at the start of each cycle. The flyback voltage is utilized to provide high voltage firing of the lamp to assist in keeping the lamp lit after the current pulse has ended.

The energy provided in the reverse-bias current generating portion of the circuit is produced by means of a voltage transformer, the secondary of which has a smaller number of turns than the primary which is parallel with the lamp winding in series combination with the reverse current blocking means. Thusly, the reverse-bias current generating means utilizes a low voltage, rather than relying upon a high DC voltage source and being subject to substantial $I^2R$ losses.

BRIEF DESCRIPTION OF THE DRAWING

The invention will be better understood from the following description taken in conjunction with the accompanying drawing, in which.

DETAILED DESCRIPTION OF THE PREFERRED EMBODIMENT

Figure 1:
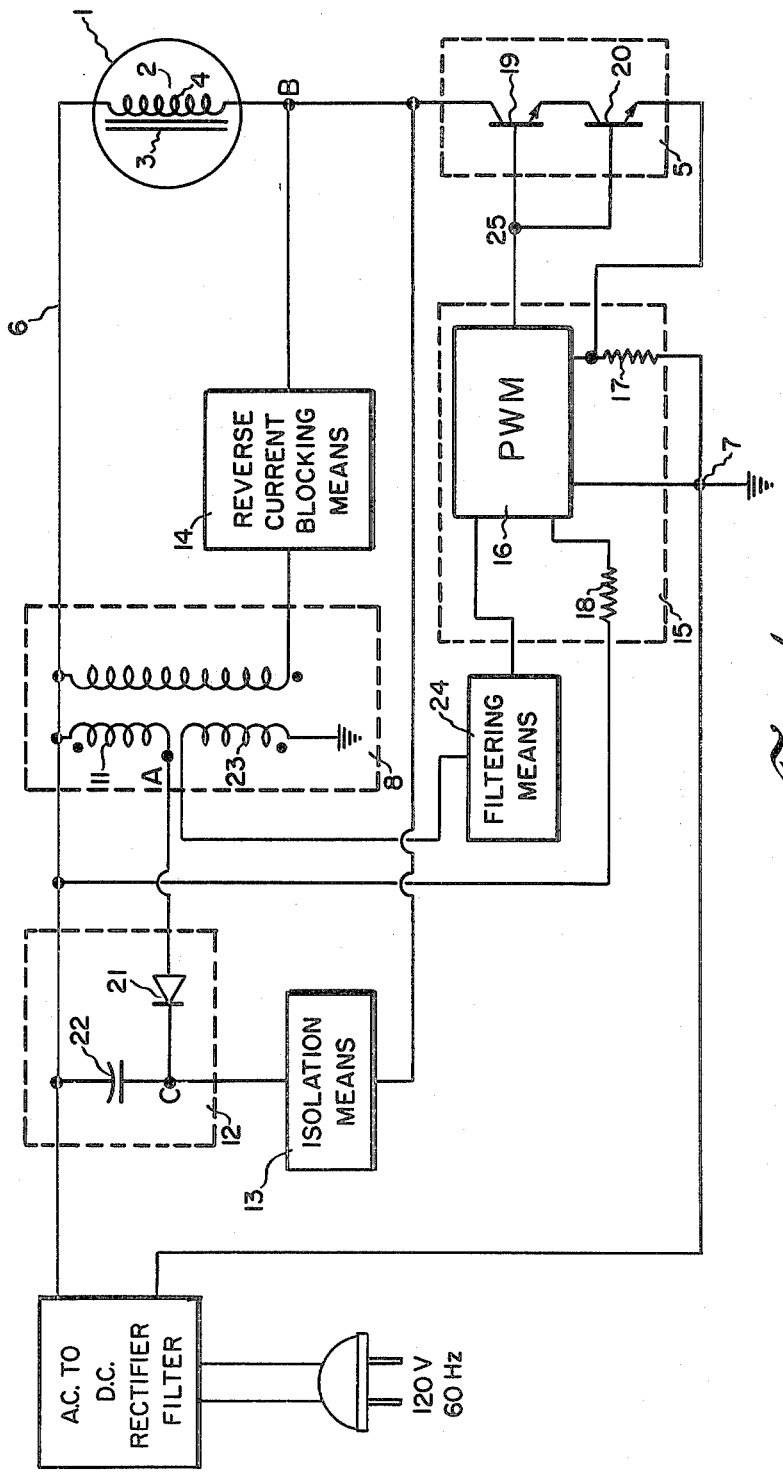
FIG. 1 is a schematic diagram of an electrodeless lamp operating circuit incorporating a preferred embodiment of the invention, with the dot notations in the diagram representing negative sides of a winding.

FIG. 1 illustrates an electrodeless lamp operating circuit embodying the present invention and wherein particular portions of the circuit are indicated in block form to facilitate the description and understanding of the invention. In the circuit illustrated, an electrodeless lamp 1 includes a magnetic core electric field inducing means which is generally designated 2 and comprises a ferrite core 3 and a winding 4. The lamp winding 4 is connected in series with a switch 5, and the combination thereof is connected between a DC reference voltage bus 6 and a ground terminal 7. The electric field inducing means 2 is connected in parallel with the primary 10 of voltage transformer 8 in series combination with reverse current blocking means 14. A first secondary 11 of the voltage transformer 8 is connected with opposite polarity to that of primary 10. Voltage from secondary 11 is applied to a filtering means 12 to provide the energy required to generate a substantially constant current that is fed from output terminal C through an isolation means 13 to the junction B of winding 4 and switch 5. The isolation means 13 prevents transients produced by the winding of the lamp from reaching the filtering means 12. When the switch 5 is off, the current coming from the isolation means 13 is fed through the lamp winding 4 in a reverse-bias direction. Reverse current blocking means 14 prevents the reverse-bias current from flowing through the primary 10 of the voltage transformer 8. The switch 5 is controlled by a control means 15 which can suitably comprise a pulse width modulator 16 effective for providing periodic signals to control the operation of the switch 5. Further description of the invention and understanding thereof will be facilitated by referring to FIGS. 2 and 3.

Figure 2:
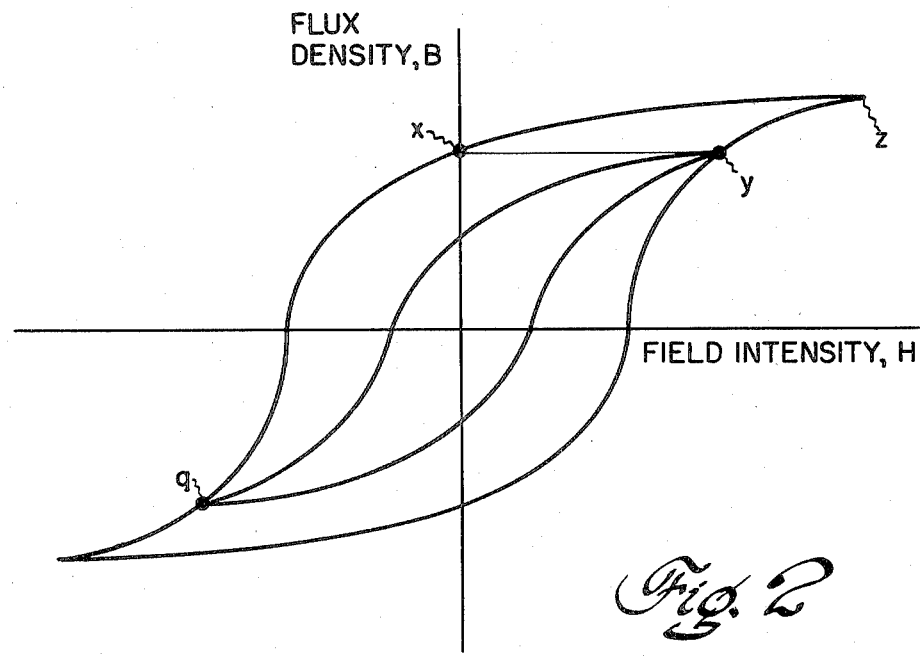
FIG. 2 is a graph showing the B-H operating characteristics of the combined winding and core of an electrodeless lamp with and without the operating circuit of the present invention.
Figure 3:
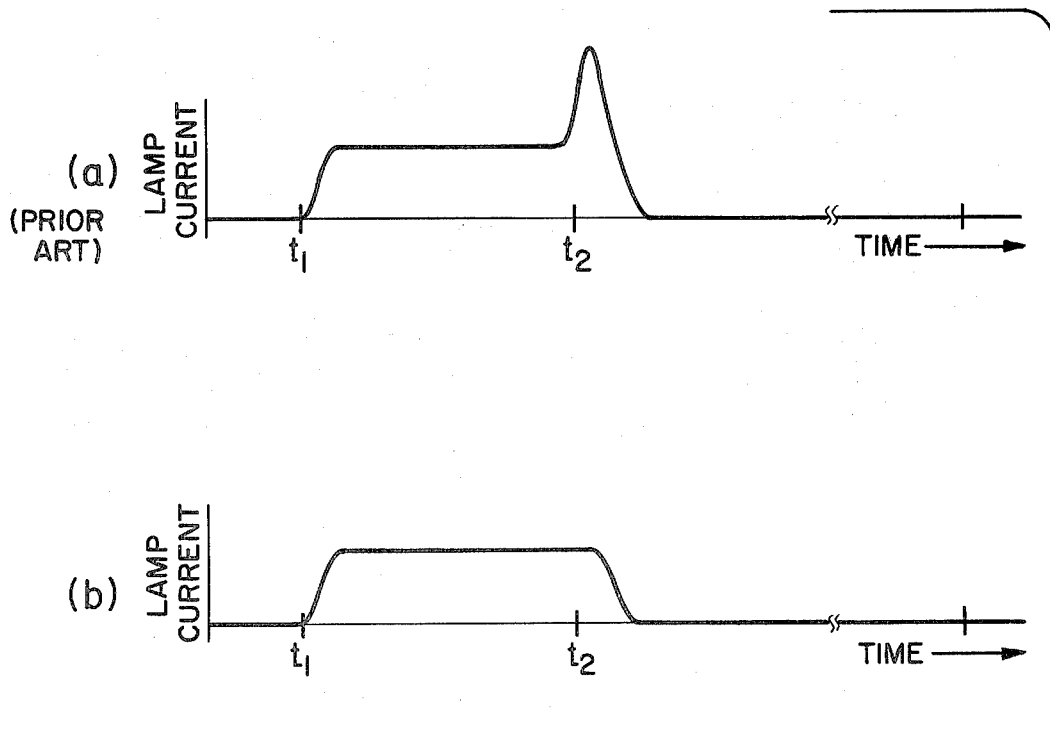
FIG. 3 is a graph showing the relationship between an electrodeless lamp operating current and time: (a) without the circuit of the invention, and (b) with the circuit of the invention.

FIG. 2 shows a typical B-H magnetization curve for a magnetic core of the type used in electric field inducing means 2. FIG. 3(a) shows the relationship between lamp winding current and time without the effect of the reverse-bias current generating means of the present invention. By applying a positive DC pulse to the winding of a magnetic core, the operating point on the B-H curve can be caused to move from point x on the left wall of the curve when no current is applied (H=0), to point y on the right wall of the curve near saturation when current is applied, and then theoretically back to point x when the current is shut off. In practice, and due to residual magnetization, the operating point slowly approaches and finally reaches saturation at point z. Thus, without the present invention, a lamp embodying an electric field inducing means including such a core would be operated in only the first quadrant of the B-H curve. When the core is at saturation, inductance drastically decreases and the current through the winding consequently rises rapidly. This occurs at the end of each period as shown in FIG. 3(a).

In accordance with the present invention, a reverse-bias current is fed to the lamp winding 4 during the time that the lamp winding is not being driven. Therefore, the core 3 is not driven into saturation (i.e., above point x of FIG. 2) when a lamp drive current pulse is on. The operating point will move between points y and q of FIG. 2. FIG. 3(b) shows the relationship between lamp winding current and time when the present invention is employed to avoid core saturation. By avoiding saturation, current through winding 4 is caused to remain substantially constant as shown in FIG. 3(b) and no rapid current rise or peak of the type indicated in FIG. 3(a) occurs. If the lamp were operated only in the first quadrant of the B-H curve of the core and no saturation-preventing circuit were utilized, a peak current at saturation of 3.5 amperes, for example, could pass through the lamp winding toward the end of the "on" cycle where this current started out at only 1 ampere. Using the invention disclosed herein, the current $i_p$ would remain at one ampere occurring at the beginning of the drive or "on" current and no rapid current rise would occur at the end of the "on" cycle. Accordingly, the present invention affords the beneficial effect of avoiding both heat energy losses ordinarily caused by saturation and the increased cost of higher current-rated switching components. Thus, it will be seen that saturation may be avoided by having the time average of all current through the core winding equal zero rather than a positive value. For example, if the lamp current applied by the drive current were one ampere, which would be applied by means of a pulse occurring during 20% (Pp) of the interval period, the reverse-bias current $i_{rb}$ should be:

$$i_{rb} = - \left[ \frac{+i_p \times P_p}{(1 - P_p)} \right] = - \frac{1 \times .2}{(1 - .2)} = -.25 \text{ amp.,}$$

or 250 ma. in the direction opposite to that of normal lamp driving current and occurring during the time that the lamp is not being driven.

Referring again to FIG. 1, a first terminal of the lamp winding 4 is connected to the DC reference voltage bus 6 and a second terminal thereof is connected to one lead of a controlled switch generally designated 5. An example of a suitable means for making these connections is the Edison screw-socket. The DC reference voltage bus 6 is the positive voltage output of a standard rectifier-filter device well known in the art and which transforms 60 Hz 120 v.a.c. to approximate DC. Typically, such device is a full wave bridge rectifier-output capacitor combination. Ground terminal 7 is the electrical ground of the circuit. DC reference voltage bus 6 drives current through the lamp winding 4 to ground 7 upon closure of switch 5. The switch 5 is controlled by an interval timer generally designated 15 and comprising a pulse width modulator 16, a current shunt resistor 17 which can be adjustable, and a starter resistor 18. When switch 5 is closed, drive current passes through winding 4 of the core of electric field inducing means 2. Interval timer 15 provides an output pulse of predetermined width at periodic intervals depicted in FIGS. 3-6 as $t_1$—$t_1$. Both the time of the interval period and the "on" time of the pulse within the interval are selectively determinable by choice of associated components. Such interval timers are well known in the art and can, for example, be of the type disclosed in "IC Interval Timers" by F. Mims, Popular Electronics, August, 1979, at 60, U.S. Pat. Nos. 4,157,087; 4,107,579 and 4,051,412, which patents are assigned to the assignee of the present invention. A specific example of a suitable interval timer comprises an NE556, sometimes referred to as a dual 555, integrated circuit available commercially from Signetics Corporation and used herein in combination with associated components including resistors 17 and 18. Resistors 17 and 18 are selected to have values effective for predeterminedly establishing desired interval length and pulse width. Interval timer 15 repetitively applies a base current at a control terminal 25 connected to switch 5 for closing the switch, and removes the base current for opening the switch. Current shunt resistor 17 determines pulse width. Starter resistor 18 initially drives the pulse width modulator for the initial interval. The combination of switch 5 and elements 16, 17 and 18 comprises, and is herein referred to as, the "controlled switching means" and elements 16, 17 and 18, in combination, comprise "control means" 15. Switch 5 theoretically operates as a high voltage, high speed turn-off transistor, but in practice, comprises a high voltage transistor 19, such as BU308 commercially available from Texas Instruments, connected in series with an emitter switch 20 such as an MJE220 high speed, low voltage transistor capable of handling about 1.5 amperes when the emitter of the high voltage transistor is connected to the collector of the emitter switch. An "emitter switch" low voltage transistor speeds up the shut-off of high voltage transistor 19. Both transistors are base-driven by pulse width modulator 16. Thus, at turn-off of the pulse at the output of pulse width modulator 16, the voltage seen at the base of emitter switch 20 is effective for turning off the emitter switch in approximately 100 nanoseconds. This causes the emitter of high voltage transistor 19 to be without any reference voltage, which in turn results in transistor 19 turning off more rapidly. The time period during which high voltage transistor 19 permits current to pass is time during which energy is dissipated in that transistor. Therefore, the faster the complete turn-off of the high voltage transistor, the lower will be the associated storage-time energy losses. This is attributable to the fact that high voltage transistors are usually fabricated with high purity semiconductor material which results in transistors having long storage times. Also, since the energy expended occurs primarily during the "on" time when the pulse width modulator produces the current that closes switch 5, and since the lamp stays lit during the "off" time, the lower the percentage of "on" time to the time of an interval the less energy that is expended.

In order to utilize energy from the lamp driving pulse to generate the reverse-bias current, voltage transformer 8 is of the "step-down" type. A second secondary 23 is included as part of transformer 8 in the embodiment illustrated, and provides energy to a second filtering means 24 which drives pulse width modulator 16. The circuit of the present invention is operated such that magnetic saturation in the core of transformer 8 is avoided.

When switch 5 is closed, both winding 4 of the lamp as well as primary 10 of the voltage transformer are energized and a voltage is induced in secondary 11. A first side of first secondary 11 is connected to DC reference voltage bus 6 and the second side of first secondary 11 is connected to the first or positive electrode of a unidirectional conducting means 21. The unidirectional conducting means 21 can, for example, be a high speed diode, such as a 2N4154 commercially available from General Electric Company. As noted above, voltage transformer 8 is a "step-down" transformer, and by means of appropriate connections the voltage across first secondary 11 is proportional to, and of opposite polarity to, voltage across the primary.

In operation, the second side, which is the lower one seen in FIG. 1, of primary 10 is negative, while the lower end or second side of first secondary 11 is positive. Thus, upon closure of switch 5 with the lower end of secondary 11 being positive, current induced in the secondary 11 passes through the unidirectional conducting device 21. Also, upon closure of switch 5, the second (negative) electrode of unidirectional conducting device 21 is at ground, which is a lower potential than that of the first (positive) electrode of the unidirectional conducting device 21. A charge storage means 22 of filtering means 12 is in parallel with the same voltage as the series combination of first secondary 11 and unidirectional conducting device 21, and has a first terminal connected to the first side of secondary 11 and its other terminal connected to the second electrode of unidirectional conducting device 21. The charge storage means is selected to have a sufficiently fast time constant to charge up to an amount effective to provide voltage across it that will become substantially equal to the voltage across secondary 11 before becoming substantially the equivalent of a DC open circuit. This function of the charge storage means 22 is substantially completed before the opening of switch 5 for each interval, as indicated at $t_2$ in FIG. 6.

The arrangement of that portion of the circuit comprising charge storage device 22 in parallel with the series combination of secondary 11 and unidirectional conducting device 21 wherein the first or positive electrode of the unidirectional conducting device is connected to the positive or second side of the secondary with the negative or second electrode of the unidirectional conducting device as the output terminal constitutes the "filtering means" 12. Thus, output terminal C is at the junction of said second electrode and the other terminal of the charge storage means. As is known in the art, a flyback (counter emf) voltage which is opposite in polarity to, and of substantially greater magnitude than, a corresponding driving voltage, is created whenever such a driving voltage in an inductance is turned off. In the present circuit, unidirectional conducting device 21 limits the energy of such flyback voltage to the lamp by preventing current from flowing through secondary 11 during the time of flyback. Inasmuch as the flyback voltage is of opposite polarity to that of the driving voltage, the positive side of the flyback voltage appears at the second (negative) side of the primary 10. This results in the second (positive) side A of secondary 11 having a negative voltage. Concurrently, second (negative) electrode C of unidirectional conducting device 21 is at a positive voltage due to the charge built up in charge storage device 22, and consequently the volages at both electrodes of the unidirectional conducting device are such that the unidirectional conducting device becomes non-conducting. Therefore, no current flows through the path of secondary 11. As a result, no energy is dissipated at the circuit elements which obtain energy from secondary 11. Thus, the energy of flyback is substantially limited to lamp electric field inducing means 2. Only a negligible amount of energy is lost in transformer 8, reverse current blocking means 14, and transistors 19 and 20 in switch 5. Additionally, unidirectional conducting device 21 prevents capacitor 22 from draining or losing its net charge upon flyback.

When switch 5 is open, the current induced in secondary 11 flows through isolation means 13 and through lamp winding 4 in the reverse-bias direction. Isolation means 13 prevents any higher voltage flyback transients originating in the lamp winding upon opening of switch 5 from being transmitted to filtering means 12 while permitting the reverse-bias current developed by the filtering means to be transmitted through lamp winding 4 in the direction opposite to that of the drive current. Isolation means 13 can, for example, be an R.F. choke coil.

Figure 4:
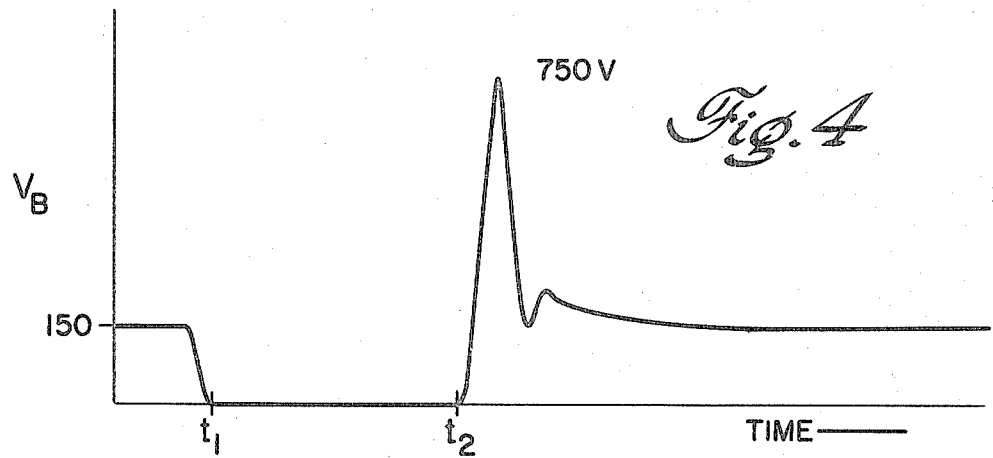
FIG. 4 is a graph showing the voltage at the collector of the high voltage transistor of the switch of the controlled switching means as a function of time utilizing the circuit of the preferred embodiment of the invention.

The reverse-bias current is prevented from significantly flowing through primary 10 by DC reverse current blocking means 14 which, for example, can be a capacitor or a significantly higher DC resistance relative to that of the lamp winding. The winding 4 of electric field inducing means 2 has significant inductance but very little resistance. The results of these characteristics in the circuit of the present invention are illustrated by the graph shown in FIG. 4, wherein is depicted the voltage at the collector side of the high voltage transistor, point B, as a function of time. FIG. 4 also shows that at the times prior to time $t_1$, the lamp winding, having such small resistance and significant inductance, causes the voltage at node B to be that of DC reference voltage bus 6. When switch 5 turns on, node B is brought to electrical ground potential. Although primary 10 (which is parallel with winding 4 of the lamp in series with blocking means 14) also has inductance, the lamp winding inductance is much lower than that of primary 10, and therefore the inductance effects of the primary are not significant by comparison. When switch 5 is turned off at time $t_2$, the inductance of winding 4 tends to drive current therethrough in the same direction as the normal driving current. Thus, the positive side of the flyback voltage will be at node B with a peak flyback voltage several times that of the applied DC reference voltage. This occurs even though a voltage from the DC reference voltage bus of opposite polarity is present across the lamp due to incomplete turn-off. Oscillatory damping occurring thereafter is caused primarily by the stray capacitance and resistance that is inherently part of the lamp winding 4. The flyback voltage is utilized to fire or start the lamp and assist in keeping it lit.

Figure 5:
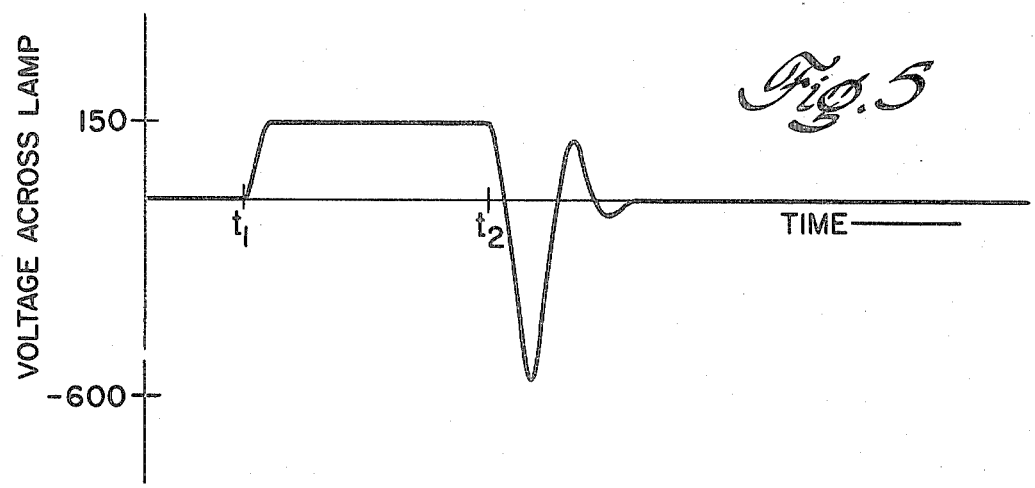
FIG. 5 is a graph showing the voltage across the lamp as a function of time utilizing the circuit of the preferred embodiment of the invention.

FIG. 5 is a graph showing the voltage across electric field inducing means 2. When switch 5 is open there is no significant voltage across lamp winding 4. When switch 5 is turned on at $t_1$, the DC reference voltage at bus 6 is applied to lamp winding 4. Finally, when switch 5 is turned off at time $t_2$, a flyback voltage starting at a high magnitude and of opppposite polarity occurs, as described above. The flyback voltage is also across primary 10 and therefore coupled to secondary 11. Consequently, the circuit must be effective to substantially confine the flyback energy to winding 4. Thus, current must be prevented from flowing in the circuit of the secondary during flyback which is the purpose and effect of unidirectional conducting device 21. By this arrangement, practically all of the energy of flyback is caused to be dissipated in lamp winding 4 for use in starting and assisting in maintaining ionization of the lamp gas.

In accordance with another aspect of the presently disclosed embodiment, and in order to avoid magnetic saturation of core 3, the circuit is effective for providing a zero time average for all current through winding 4. This is accomplished by selection of circuit components of predetermined values in an arrangement which is effective for maintaining equal: (1) the product of (a) the percentage of time of an interval that the reverse-bias current is "on" and (b) amperage for the reverse-bias current; and (2) the product of (a) the percentage of time of an interval that the drive current is "on" and (b) amperage for the drive current. For example, if the drive current is one amp, which will be on the 20% of an interval, the appropriate reverse-bias current will be 250 ma., in accordance with the equation stated above near the beginning of this Detailed Description. For such value of reverse-bias current, which is small compared to the drive current, the voltage transformer must be of the step-down type with appropriate connections. To maintain the magnitude of the reverse-bias current substantially constant, the time constant of the components of the "filtering means" should be sufficiently slow. For example, a time constant which would result in a 10% loss of voltage across the charge storage means over a period of one interval, where the DC reference bus voltage was 150 volts and a 10:1 step-down transformer were included, would suggest a capacitor of value:

$$C = \frac{i}{\left(\frac{dv}{dt}\right)} = \frac{.25}{\frac{1.5}{(10^{-5})}} = \frac{5}{30} \times 10^{-5} = 1.7 \times 10^{-6} fd.$$
$$= 1.7 \times 10^{-6} fd.$$
$$= 1.7 \mu fd.$$

This ideally assumes that all of the reverse-bias current flows through the lamp winding and therefore that none of the reverse-bias current flows through the path of primary 10. In practice, if a 1 ufd. capacitor were selected as the charge storage device with a 50 nf. capacitor as the DC reverse current blocking means and a 200 ma. reverse-bias current flowed through the lamp winding, then to increase the reverse-bias current through the lamp winding by 25% to 250 ma., the DC reverse current blocking capacitor could be increased by 25% to 63 nf. which would increase the current through the primary by 25% and in turn increase by the same percentage the current produced by the filtering means. Consequently, the reverse-bias current through the lamp winding would increase by 25%.

Figure 6:
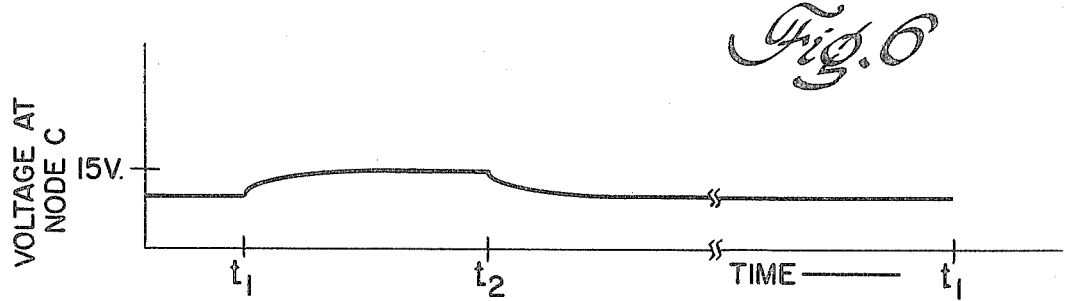
FIG. 6 is a graph showing the voltage at the positive terminal of the charge storage means designated C in FIG. 1, as a function of time.

FIG. 6 illustrates the typical relationship between voltage at node C, the output terminal of filtering means 12, and time. When controlled switch 5 is turned on at time $t_1$, charge storage means 22 begins to charge until the voltage across the capacitor is equal to that across secondary 11. When controlled switch 5 is turned off at time $t_2$, the capacitor begins to discharge. Because of the relatively slow time constant, the voltage across the capacitor declines only a small percentage of its "on" voltage (for example, 10%) before switch 5 is turned on again.

Thus, as has been pointed out, this reverse-bias current flows through lamp winding 4 in a direction opposite to that of the drive current during the time that the lamp is off and thus causes the operating point on the B-H curve to be at point q in FIG. 2 during that time. When switch 5 is closed and thus the drive current flows through lamp winding 4, the operating point on the B-H curve is at point y. By preventing residual magnetization by maintaining a zero net current averaged over time, saturation and the associated heat energy losses are avoided. In this manner, an electric field inducing means lamp can be operated in a highly efficient manner.

Another feature of this invention is its inherent self-compensation with respect to line voltage variations. As the DC reference voltage at bus 6 varies, the lamp current varies in the same direction during the "on" condition of switch 5 and thus at the same time the feedback reverse-bias current varies in the same direction by the same percentage change. Therefore, the reverse-bias current generating means compensates for changes in line voltage.

In a typical circuit in accordance with the invention and wherein the circuit has an interval repetition rate of approximately 100 kHz (approximately 10 usec interval length) and a pulse width of approximately 2 usec. (approximately 20% duty cycle), pulse width modulator 16 is a Signetics dual-555 (NE556), isolation means 13 is a conventional r.f. choke of approximately 3 mh., high speed diode 21 in the secondary circuit is a 2N4154, charge storage means 22 is a 1 uf. capacitor, transformer 8 is a ferrite core transformer, the core of which is a 3C8 material available from Ferroxcube Corporation, Saugerties, N.Y., having 100 turns on the primary 10 and 10 turns on each of two secondaries 11, 23 (10:1 turns ratio), DC reverse current blocking means 14 is a capacitor of approximately 50 or 63 nf., high voltage transistor 19 is a Siemens BU308, and low voltage emitter switch 20 is a Motorola MJE220. The inductance of primary 10 is approximately 1 mh. while the inductance of lamp winding 4 varies between 3 and 10 $\mu$h. (the lower value occurring after lamp ignition and plasma coupling). Current shunt resistor 17 is 0.5 ohm and starter resistor 18 is 50 K ohms. Second filtering means 24 is similar in structure to that of filtering means 12. Additionally, a Zener diode may be applied to the output of second filtering means 24 for better voltage regulation.

While a combination including a positive DC reference voltage bus, npn transistors, and a unidirectional conducting device having a current path in one direction has been shown, it will be understood from the foregoing that a combination including pnp transistors, a unidirectional conducting device having its current conducting path in the opposite direction and a negative DC reference voltage bus can alternatively be used in the herein disclosed embodiment of the present invention.

While the present invention has been described with reference to a particular embodiment and method of operation, it will be understood from the foregoing that numerous modifications may be made by those skilled in the art without departing from the scope of the invention. Therefore, the appended claims are intended to cover all modifications coming within the true spirit and scope of the invention.

What is claimed as new and desired to be secured by Letters Patent of the United States is:

1. In an operating circuit for an electrodeless lamp, means for providing a reverse-bias current to the winding of a magnetic core electric field inducing means in said lamp to reduce magnetic saturation of the core thereby to enhance electrical operating efficiency of said lamp comprising:
    (a) controlled switching means comprising a switch, an input lead, an output lead, and a control means effective for repetitively operating said switch at radio frequencies to provide periodic intervals of transmission between said input and output leads;
    (b) energizing means for applying direct current potential across the winding of said electric field inducting means when said switch is closed, said energizing means comprising a DC reference voltage bus and a ground terminal, said bus being connected to one terminal of said winding, said ground terminal being coupled to the output lead of said controlled switching means and said input lead of said controlled switching means being connected to the other terminal of said winding;
    (c) a voltage transformer having a primary and a secondary each with first and second sides, and providing a voltage across said secondary which is proportional to and of opposite polarity to that across said primary;
    (d) means connecting the first sides of both said primary and said secondary to said DC reference voltage bus terminal;
    (e) filtering means comprising:
        (i) a unidirectional conducting means having first and second electrodes, said first electrode connected to said second side of said voltage transformer secondary, and
        (ii) charge storage means connected between the first side of said voltage transformer secondary and the second electrode of said unidirectional conducting means;
    (f) isolation means connected between said second electrode and said other terminal of said winding, whereby a substantially constant DC current flows through the isolation means, charge is stored when said switch is closed, and the stored charge flows through said winding in a reverse-bias direction when said switch is open; and
    (g) reverse current blocking means connected between said second side of said primary and said other terminal of said winding, whereby
        (i) an energizing current is supplied to said winding when said switch is closed,
        (ii) said unidirectional conducting means prevents current flow through said secondary and said filtering means during opening of said switch,
        (iii) said isolation means prevents transients at said winding from reaching said filtering means during opening of said switch without short circuiting said DC reference voltage bus to said ground terminal upon closing of said switch, and
        (iv) said reverse current blocking means prevents currents developed by said filtering means from being conducted to said primary and thus allows substantially constant DC current to flow through said winding when said switch is open in a direction opposite to said energizing current thereby to minimize energy losses due to saturation of said core.

2. The invention according to claim 1, wherein said control means of said controlled switching means comprises a control lead and timing means effective for repetitively energizing said control lead at predetermined intervals.

3. The invention according to claim 2, wherein said timing means comprises a pulse width modulator and a starter resistor connecting said pulse width modulator to said DC reference voltage bus, and further including a shunt resistor coupling said ground terminal to the output lead of said controlled switching means, the junction of said shunt resistor and the output lead of said switch means being connected to said timing means.

4. The invention according to claim 2, wherein said switch of said controlled switching means comprises a transistor having a collector, an emitter and a base, said base being connected to said control lead of said control means.

5. The invention according to claim 2, wherein said switch comprises a high voltage transistor and a high speed low voltage emitter switch transistor, the emitter of said high voltage transistor being connected in series with the collector of said low voltage emitter switch transistor, and the bases of both said transistors being connected to the control lead of said control means.

6. The invention according to claim 2, wherein said switch means comprises a high voltage npn transistor and a high speed low voltage npn emitter switch transistor, the emitter of said high voltage npn transistor being connected in series with the collector of said low voltage npn emitter switch transistor, and the bases of both said transistors being connected to the control lead of said control means.

7. The invention according to claim 1, wherein said isolation means comprises a choke effective to prevent repetitive transient voltages occurring at radio frequencies from appearing at the junction of said charge storage means and said unidirectional conducting means.

8. The invention according to claim 5, wherein said isolation means comprises a choke effective to prevent repetitive transient voltages occurring at radio frequencies from appearing at the junction of said charge storage means and said unidirectional conducting means.

9. The invention according to claim 6, wherein said isolation means comprises a choke effective to prevent repetitive transient voltages occurring at radio frequencies from appearing at the junction of said charge storage means and said unidirectional conducting means.

10. The invention according to claim 1, wherein said reverse current blocking means comprises a capacitor.

11. The invention according to claim 1, wherein said reverse current blocking means comprises a resistance element significantly higher in ohmic value than the resistance of the lamp winding.

12. The invention according to claim 1, wherein said voltage transformer comprises a voltage step-down transformer operated within linear characteristics.

13. The invention of claim 1, wherein said charge storage means of said filtering means comprises a capacitor and said unidirectional conducting means of said filtering means comprises a diode.

14. The invention according to claim 1, further comprising a second secondary of said voltage transformer, and a second filtering means coupling said second secondary to said control means of said controlled switching means and cooperatively effective to provide energy to said control means.

15. A method for operating an electrodeless lamp having an electric field inducing means including a winding, comprising the steps of:
 (a) applying an energizing direct current in a forward direction through the winding of said electric field inducing means repetitively at a preset frequency between approximately 50 kHz and approximately 1 MHz for a percentage (Pp) of the time of each periodic interval determined by said frequency;
 (b) storing charge while applying said energizing direct current to said electric field inducing means; and
 (c) applying a reverse-bias current developed from said stored charge in a reverse direction through the winding of said electric field inducing means during the portion of each said periodic interval when said energizing direct current is not being applied.

16. The method according to claim 15, wherein the application of energizing direct current is at a preset frequency of operation of approximately 100 kHz and the percentage of the time of an interval, Pp, is approximately 20%.

17. The method according to claim 15, further comprising the step of blocking all currents that would result from transient flyback voltages at the winding of the electric field inducing means except at said winding.

* * * * *